US007825798B2

(12) United States Patent
Torres

(10) Patent No.: US 7,825,798 B2
(45) Date of Patent: Nov. 2, 2010

(54) SECURITY AND TRACKING SYSTEM TO PREVENT THE UNAUTHORIZED USE OR ACCESS TO A DEVICE HAVING HYDRAULIC COMPONENTS

(76) Inventor: Juan G. Torres, 16955 SW. 182 Ave., Miami, FL (US) 33187

( * ) Notice: Subject to any disclaimer, the term of this patent is extended or adjusted under 35 U.S.C. 154(b) by 345 days.

(21) Appl. No.: 12/215,276

(22) Filed: Jun. 26, 2008

(65) Prior Publication Data

US 2009/0322519 A1    Dec. 31, 2009

(51) Int. Cl.
*G08B 1/08* (2006.01)
(52) U.S. Cl. .................. 340/539.31; 340/541; 340/565; 340/426.1; 340/426.11; 280/124.158
(58) Field of Classification Search ............ 340/539.31, 340/426.1, 541, 545.6, 565, 531, 539.1, 426.11, 340/426.13; 37/234; 73/862.37, 168; 81/301; 137/565.19; 172/812; 212/304; 280/124.158
See application file for complete search history.

(56) References Cited

U.S. PATENT DOCUMENTS

| 6,202,014 B1 * | 3/2001 | Brandt et al. ................. 701/50 |
| 6,691,435 B1 * | 2/2004 | Schultz et al. ................ 37/234 |
| 6,782,644 B2 * | 8/2004 | Fujishima et al. ............. 37/348 |
| 7,002,465 B2 | 2/2006 | Komatsu |
| 7,005,997 B1 * | 2/2006 | Wiewiura .................... 340/679 |
| 7,295,098 B2 * | 11/2007 | Betts, Jr. et al. .............. 340/5.2 |
| 2004/0036583 A1 * | 2/2004 | Kajita et al. ............. 340/426.1 |
| 2005/0016168 A1 * | 1/2005 | Singh .......................... 60/413 |
| 2005/0204587 A1 | 9/2005 | Kime |

* cited by examiner

*Primary Examiner*—George A Bugg
*Assistant Examiner*—Kerri McNally
(74) *Attorney, Agent, or Firm*—Ruben Alcoba, Esq.; Craig Kirsch, Esq.

(57) ABSTRACT

A security and tracking system to prevent the unauthorized use or access to machinery having hydraulic components whereby the system has a rerouting device housed in a tamperproof casing. The rerouting device might have a selective re-directional valve that can be remotely activated and monitored using wireless signal technology to direct hydraulic fluid to at least two hydraulic circuits, a control center that communicates via wireless signal technology to the rerouting device, a first hydraulic circuit that has a source of fluid, a fluid pumping means, the rerouting device, and a power take off device (PTO) and a second hydraulic circuit that has the source of fluid, the fluid pumping means, and the rerouting device. In operation the rerouting device selectively routs hydraulic fluid about the hydraulic circuit that includes the PTO, thereby rendering the hydraulic equipment functionally operable until the hydraulic fluid is rerouted to the second hydraulic circuit.

8 Claims, 3 Drawing Sheets

SECURITY AND TRACKING SYSTEM TO PREVENT THE UNAUTHORIZED USE OR ACCESS TO A DEVICE HAVING HYDRAULIC COMPONENTS

BACKGROUND

The present invention is a security and tracking system to prevent the unauthorized use or access to a device having at least two hydraulic circuits that remotely directs hydraulic fluid about a bypass hydraulic circuit thereby eliminating the possibility of unauthorized use of hydraulic components of certain heavy machinery and providing for a means of tracking and monitoring same.

The inventor has been in the automotive electric and security industry for over 25 years and has witnessed the evolution in security and monitoring devices in both the commercial and consumer sectors of the automotive industry. As the owner of a small business, the inventor intimately understands the need for preventing the unauthorized use of company equipment as well as the need for a reliable means of tracking the location and monitoring of the same. After hearing colleagues complain about their employees using company equipment to subsidize "after-hour second jobs," the inventor realized that this problem had not been adequately addressed.

Certain industries, including, the towing, wrecker, and construction industries rely heavily on the use of machinery that includes hydraulic circuitry to operate certain components necessary to achieve the goals in the respective industry, i.e. the towing and wrecker industry relies heavily on the use of hydraulic circuitry to operate the hydraulic lifts on tow trucks and flat bed transport vehicles necessary to transport disabled or damaged vehicles. Such machinery has a limited operating life that decreases as the machinery is used. As the machinery has a finite life expectancy, an owner of such machinery can maximize its benefits by limiting the use of the machinery solely to "on the clock" authorized use. Conversely, the "off the clock" unauthorized use of any such machinery has a quantifiable detrimental effect on the return on investment for the machinery in question.

As it is customary in the industry for employees to have unfettered access to the company's tow trucks, wreckers, or other such equipment, it is very difficult for owners of such companies to monitor the actions of their employees with respect to the company's equipment.

In order to address this problem the inventor invented the present invention, specifically a security and tracking system to prevent unauthorized use or access to a company's hydraulic equipment. The present invention comprises essentially of a rerouting device, that comprises inter alia, a selective re-directional valve and a check valve housed in a tamperproof casing that can be remotely activated and monitored using wireless signal technology to direct hydraulic fluid to at least two hydraulic circuits, a control center that communicates via wireless signal technology to the rerouting device, a first hydraulic circuit that comprises a source of fluid, a fluid pumping means, the rerouting device, and a power take off device (PTO) and a second hydraulic circuit that comprises the source of fluid, the fluid pumping means, and the rerouting device.

In normal operation, when the present invention is installed into a piece of machinery having hydraulic components, hydraulic fluid circulates about the second hydraulic circuit comprising the source of fluid, the fluid pumping means, and the rerouting device.

However, when the rerouting device is activated via wireless signal technology, the hydraulic fluid is selectively routed to the first hydraulic circuit that includes the PTO thereby rendering the piece of hydraulic equipment functionally operable until the hydraulic fluid is rerouted back to the second hydraulic circuit lacking the PTO.

As the rerouting device is housed in a tamper proof casing and only authorized personnel have the proper credentials to communicate with the rerouting device from the control center, unauthorized use of company equipment can be virtually eliminated. Furthermore, as the rerouting device includes a means for tracking the system, an owner of machinery with the present invention installed thereon can track the exact location of any such machinery at anytime.

An objective of the present invention, is to provide a system that will prevent the unauthorized use or access to machinery with hydraulic components.

Another objective of the present invention, is to provide a system that can provide a means for tracking the location of machinery with hydraulic components.

Another objective of the present invention, is to provide a system that can be controlled and monitored remotely using wireless signal technology.

Yet a further objective of the present invention, is to provide a system that is tamperproof to ensure that the system is not compromised.

Information relevant to attempts to address these problems can be found in U.S. Pat. No. 7,002,465 (hereinafter the "465 patent") and United States Patent Publication 2005/0204587 (hereinafter the "587 publication"). However, each one of these reference suffers from one or more of the following disadvantages. The references fail to address a security and tracking system that can be monitored and controlled remotely to selectively re-rout hydraulic fluid about an alternate hydraulic circuit to prevent use of the equipment.

For the foregoing reasons there exists a need for a security and tracking system to prevent unauthorized use or access to machinery with hydraulic components comprising essentially a rerouting device housed in a tamperproof casing, that comprises inter alia a selective re-directional valve that can be remotely activated and monitored using wireless signal technology to direct hydraulic fluid to at least two hydraulic circuits, a control center that communicates via wireless signal technology to the rerouting device, a first hydraulic circuit that comprises a source of fluid, a fluid pumping means, the rerouting device, and a power take off device (PTO) and a second hydraulic circuit that comprises the source of fluid, the fluid pumping means, and the rerouting device.

SUMMARY

The present invention is a security and tracking system to prevent unauthorized use or access to hydraulic equipment comprising essentially a rerouting device housed in a tamperproof casing, further comprising, inter alia, a selective re-directional valve that can be remotely activated and monitored using wireless signal technology to direct hydraulic fluid to at least two hydraulic circuits, a control center that communicates via wireless signal technology to the rerouting device, a first hydraulic circuit that comprises a source of fluid, a fluid pumping means, the rerouting device, and a power take off device (PTO) and a second hydraulic circuit that comprises the source of fluid, the fluid pumping means, and the rerouting device.

In normal operation, when the present invention is installed into a piece of machinery having hydraulic components, hydraulic fluid circulates about the second hydraulic circuit comprising the source of fluid, the fluid pumping means, and the rerouting device. However, when the rerouting device is activated via wireless signal technology, the hydraulic fluid is selectively routed to the first hydraulic circuit that includes the PTO thereby rendering the piece of hydraulic equipment functionally operable until the hydraulic fluid is rerouted back to the second hydraulic circuit lacking the PTO. The system might also communicate the real time location of the system with the control center so that an end user may have real time tracking capabilities of the system.

DRAWINGS

These and other features, aspects, and advantages of the present invention will become better understood with regard to the following description, appended claims and drawings where:

DESCRIPTION

Figure 1:
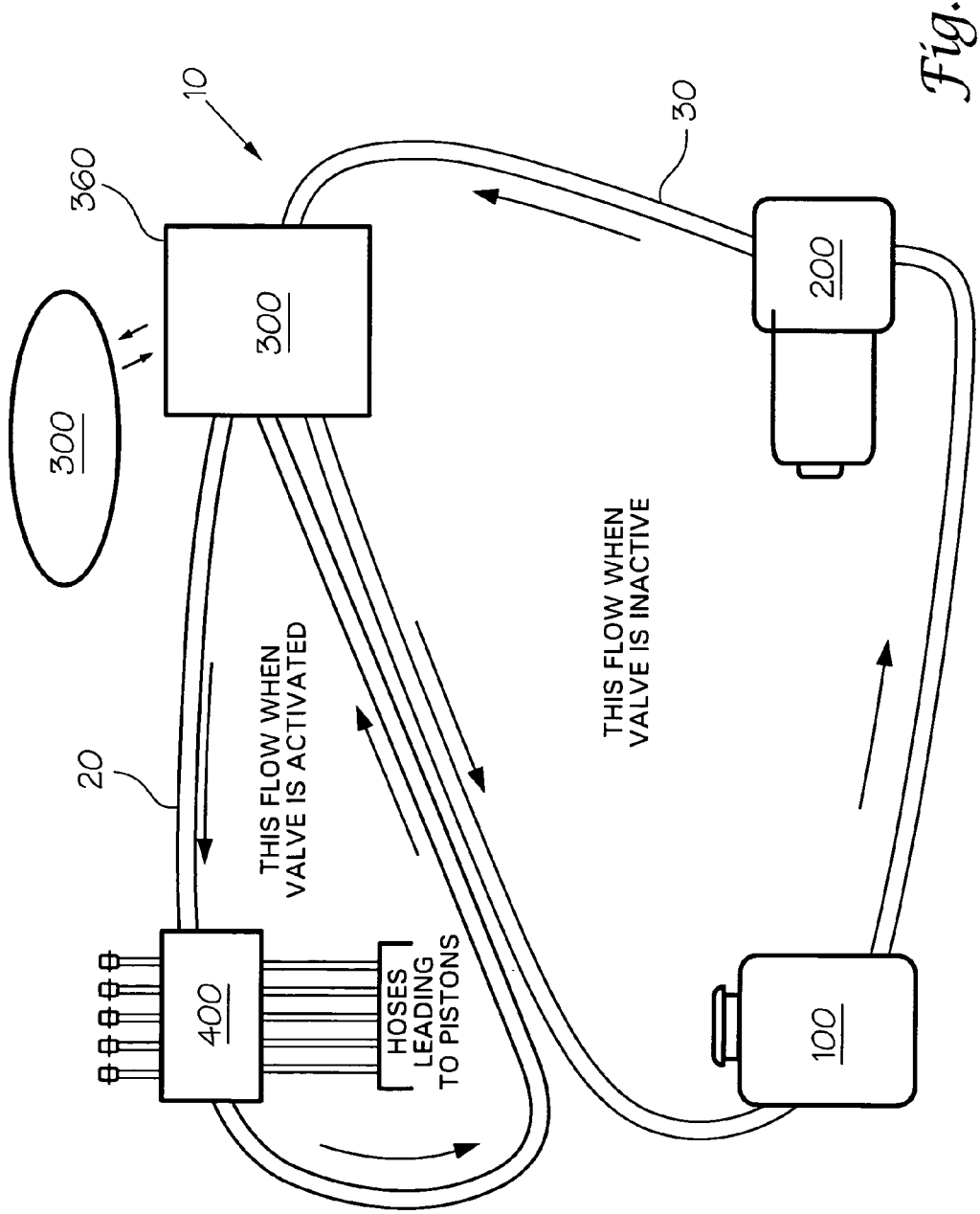
FIG. 1 shows a schematic diagram of the security and tracking system.

As shown in FIG. 1, a security and tracking system 10 comprising a source of fluid 100, a fluid pumping means 200, a rerouting device 300, a Power Turn Off (PTO) device 400 and a control center 500.

The source of fluid 100 is configured in fluid communication with the fluid pumping means 200, the fluid pumping means 200 is configured in fluid communication with the rerouting device 300, the rerouting device 300 is selectively configured to be in fluid communication with both the PTO 400 and the source of fluid 100, and the PTO 400 is in fluid communication with the rerouting device 300, thereby creating a first hydraulic circuit 20 comprising of the fluid source 100, the fluid pumping means 200, the rerouting device 300 and the PTO 400, and a second hydraulic circuit 30 comprising the fluid source 100, the fluid pumping means 200, and the rerouting device 300.

The source of fluid 100 is known in art and might be constructed of a non-corrosive rigid material capable of retaining a pressurized fluid. The material might be a composite plastic or a metal/alloy material. Methods of configuring components of hydraulic circuits in fluid communication with each other are known in the art and might be achieved using rubber or composite rubber tubing or hoses. The fluid pumping means 200 is known in the art and might be capable of generating up to 3000 P.S.I. of pressure.

Figure 2:
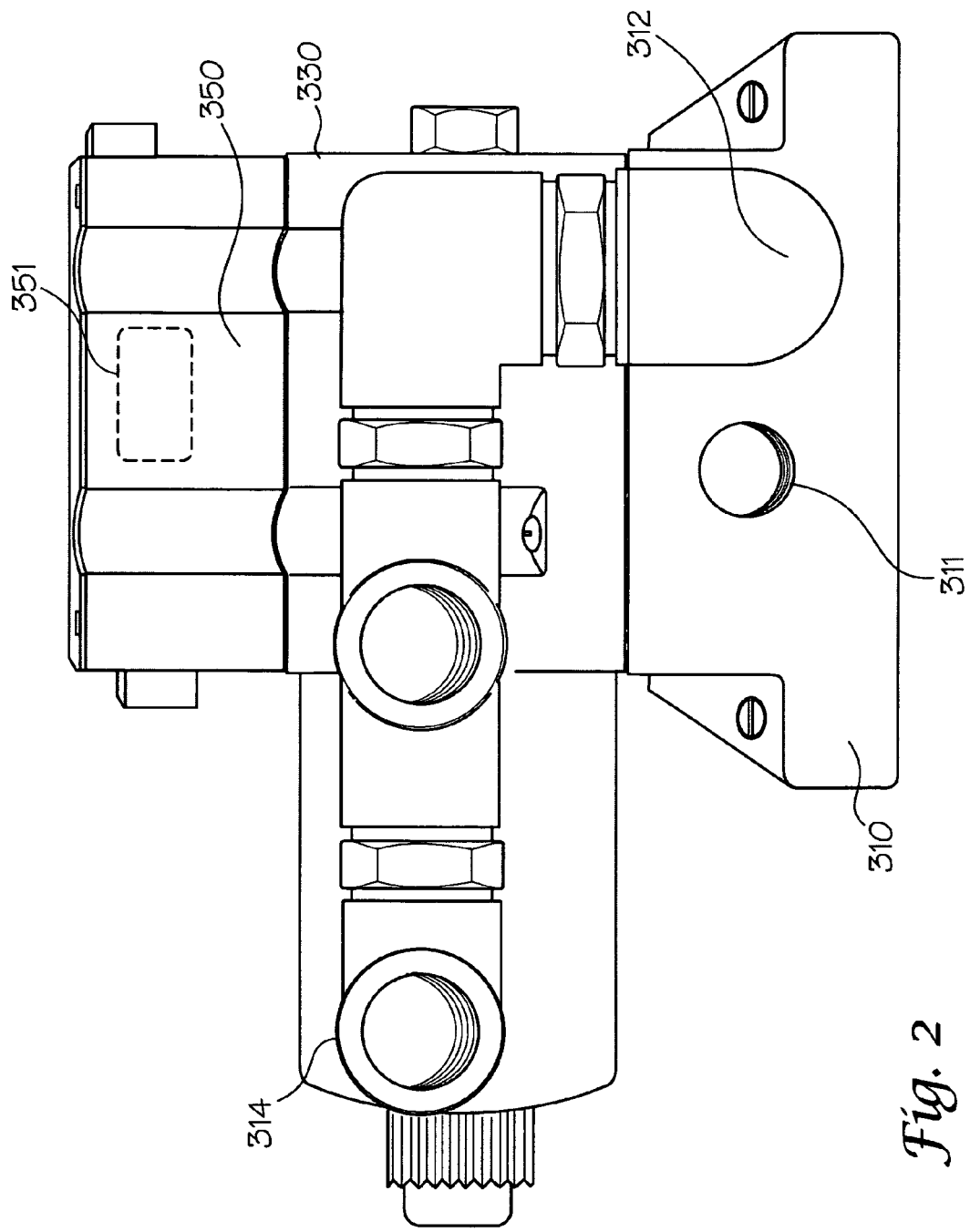
FIG. 2 shows a left sided perspective/elevation view of one embodiment of the rerouting device.
Figure 3:
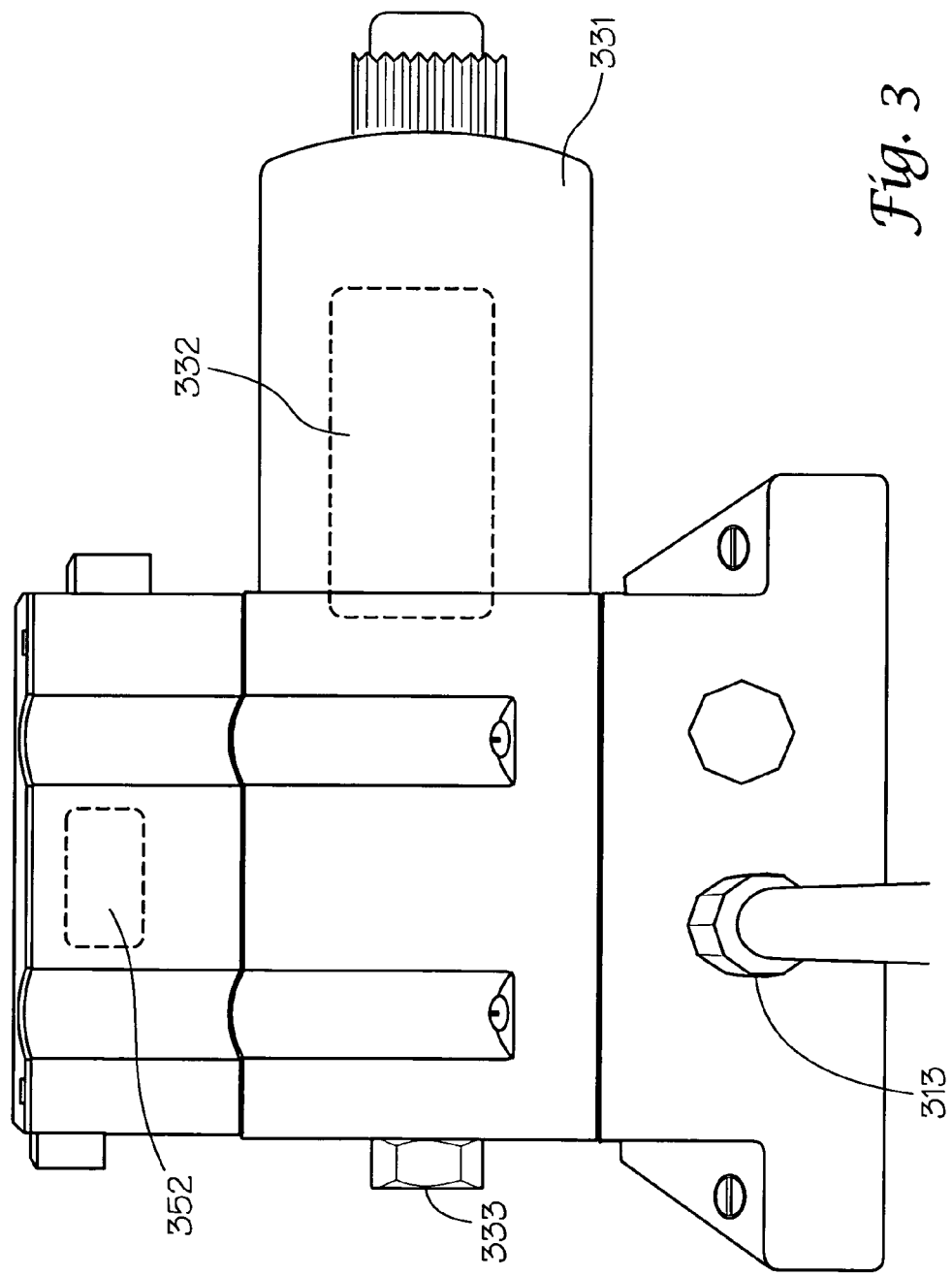
FIG. 3 shows a right sided perspective/elevation view of one embodiment of the rerouting device.

As can be seen in FIGS. 2 and 3, one embodiment of the rerouting device 300 might comprise a valve base 310, having an upper surface and a lower surface, a valve body 330, having an upper surface and a lower surface, and an electronic valve control 350, having an upper surface and a lower surface.

The valve base 310 might further comprises at least one fluid output port 311 configured in fluid communication to the PTO; at least one fluid output port 312 further comprising a check valve 314 in configured in fluid communication with the source of fluid 100; and at least one fluid input port 313 configured in fluid communication with the fluid pumping means 200, whereby the upper surface of the valve base 310 is fixedly attached to the lower surface of the valve body 330. The valve body 330 might further comprise a solenoid 331 having a first end and a second end; a re-directional valve 332 housed within the solenoid 331 capable of sustaining at least 4500 P.S.I of pressure and configured in fluid communication with fluid output port 311, fluid output port 312 and fluid input port 313; and a bleed plug 333 removably attached to the first end of the solenoid 331 and configured in fluid communication with fluid output port 311, fluid output port 312 and fluid input port 313, whereby the upper surface of the valve body 330 is fixedly attached to the lower surface of the electronic valve control 350. The electronic valve control 350 further comprises a means for receiving wireless signal technology 351 from the control center 500 to activate the solenoid 331 and a means for sending wireless signal technology 352 to control center 500. Means for sending and receiving wireless signal technology from a control center are known in the art and might include using Global Positioning System (G.P.S.) technologies. The rerouting device 300 is housed in a tamperproof casing 360 constructed of a rigid, durable material known in the art.

The PTO 400 is known in the art and serves as the activation switch for any components in fluid communication with the hydraulic circuit, for example a hydraulic tow lift (not shown).

The control center 500 is known in the art and might include G.P.S. or other wireless communication technologies.

In operation, the electronic valve control 350 might receive a wireless signal from the control center 500 thereby activating the solenoid 331 which communicates with the re-directional valve 332 thereby selectively redirecting the fluid about the hydraulic circuits. The electronic valve control 350 might send wireless signal technology to an end user to communicate the real time location of the system 10.

When fluid is selectively directed about the first hydraulic circuit 20, the PTO 400 is supplied with fluid and any hydraulic components (not shown) in fluid communication with the PTO 400 may function normally; however, when fluid is selectively directed about the second hydraulic circuit 30, the PTO 400 is bypassed, thereby preventing the PTO 400 from receiving any fluid and any hydraulic components (not shown) in fluid communication with the PTO 400 are effectively blocked and inoperable.

An advantage of the present invention is that it provides a system that will prevent the unauthorized use or access to hydraulic equipment.

Another advantage of the present invention is that it provides a system that can provide a means for tracking the location of hydraulic equipment.

Another advantage of the present invention is that it provides a system that can be controlled and monitored remotely using wireless signal technology.

Yet still another advantage of the present invention is that it provides a system that is tamperproof to ensure that the system is not compromised.

Although the present invention has been described in considerable detail with reference to certain preferred versions thereof, other versions are possible. Therefore, the spirit and the scope of the claims should not be limited to the description of the preferred versions contained herein.

What is claimed is:

1. A security and tracking system to prevent unauthorized use or access to a device, comprising:
   a rerouting device, the rerouting device is a selective re-directional valve that can be remotely activated using wireless signal technology to direct hydraulic fluid to at least two hydraulic circuits, and wherein the rerouting device further comprises at least one fluid input port, at least one check valve, at least two fluid output ports, an electronic valve control, the re-directional valve capable of sustaining at least 4500 P.S.I. of pressure, and a means for receiving input signals from remote sources and sending output signals to remote sources;

a control center, the control center communicates via wireless signal technology to the rerouting device;

a first hydraulic circuit, the first hydraulic circuit comprises a source of fluid, a fluid pumping means, the rerouting device, and a power take off device (PTO) and the first hydraulic circuit is configured so that the source of fluid is configured in fluid communication with the fluid pumping means, the fluid pumping means is configured in fluid communication with the rerouting device, the rerouting device is in fluid communication with the PTO, the PTO is in fluid communication with the rerouting device, and the rerouting device is in fluid communication with the source of fluid, thereby completing the first hydraulic circuit; and a second hydraulic circuit, the second hydraulic circuit comprises the source of fluid, the fluid pumping means, and the rerouting device, the second hydraulic circuit is configured so that the source of fluid is configured in fluid communication with the fluid pumping means, the fluid pumping means is configured in fluid communication with the rerouting device, and the rerouting device is in fluid communication with the source of fluid, thereby completing the second hydraulic circuit.

2. The security and tracking system of claim 1, wherein one of the remote source is a Global Positioning System (GPS).

3. The security and tracking system of claim 2, wherein the output signals communicate information related to a use and location of the system.

4. The security and tracking system of claim 3, wherein a routing of the hydraulic circuit is dependent upon the signals received from the remote source.

5. The security and tracking system of claim 4, wherein the rerouting device is housed in a tamperproof casing.

6. The security and tracking system of claim 5, wherein the routing of the hydraulic circuit may selectively include the source of fluid, the fluid pumping means and the PTO.

7. The security and tracking system of claim 6, wherein the routing of the hydraulic circuit may be selectively limited to the source of fluid and the fluid pumping means.

8. A security and tracking system to prevent unauthorized use or access to a device, comprising:

a rerouting device, the rerouting device is a selective re-directional valve of at least 4500 P.S.I. comprising at least one fluid input ports, at least one check valve, at least two fluid output ports, an electronic valve control, a means for receiving input signals from remote sources such as Global Positioning Systems (GPS) and sending output signals that communicate information related to a use and location of the system to the remote sources such as the GPS that can be remotely activated using wireless signal technology to direct hydraulic fluid to at least two hydraulic circuits wherein the rerouting device is housed in a tamper proof casing and a routing of the hydraulic circuit is dependent upon the signals received from the remote sources;

a control center, the control center communicates via wireless signal technology to the rerouting device;

a first hydraulic circuit, the first hydraulic circuit comprises a source of fluid, a fluid pumping means, the rerouting device, and a power take off device (PTO) and the first hydraulic circuit is configured so that the source of fluid is configured in fluid communication with the fluid pumping means, the fluid pumping means is configured in fluid communication with the rerouting device, the rerouting device is in fluid communication with the PTO, the PTO is in fluid communication with the rerouting device, and the rerouting device is in fluid communication with source of fluid, thereby completing the first hydraulic circuit; and a second hydraulic circuit, the second hydraulic circuit comprises the source of fluid, the fluid pumping means, and the rerouting device, the second hydraulic circuit is configured so that the source of fluid is configured in fluid communication with the fluid pumping means, the fluid pumping means is configured in fluid communication with the rerouting device, and the rerouting device is in fluid communication with the source of fluid, thereby completing the second hydraulic circuit.

\* \* \* \* \*